United States Patent
Peat

[15] 3,706,442
[45] Dec. 19, 1972

[54] MOBILE FEED MIXER AND BUNK LOADER

[72] Inventor: Robert W. Peat, Garden City, Kans.
[73] Assignee: Butler Manufacturing Company, Kansas City, Mo.
[22] Filed: March 25, 1971
[21] Appl. No.: 127,878

[52] U.S. Cl. ........................................259/41, 259/6
[51] Int. Cl. ..........................B01f 7/08, B01f 15/02
[58] Field of Search .......259/6, 21, 41, 104; 298/17.5

[56] References Cited

UNITED STATES PATENTS

| | | | |
|---|---|---|---|
| 3,482,821 | 12/1969 | Blackwood | 259/41 X |
| 3,258,270 | 6/1966 | Ferris | 298/17.5 UX |
| 2,576,177 | 11/1951 | Herr | 259/6 |
| 3,090,605 | 5/1963 | Copeland et al. | 259/104 |

Primary Examiner—William I. Price
Assistant Examiner—Philip R. Coe
Attorney—Scofield, Kokjer, Scofield & Lowe

[57] ABSTRACT

A truck having a mixing box with internal augers which move material along the bottom of the box from the ends toward the midpoint along the bottom, upwardly and then back toward the ends. A lateral discharge conveyor is located at the midpoint to deliver material to one side. The discharge is located near the rear wheels of the truck.

1 Claim, 7 Drawing Figures

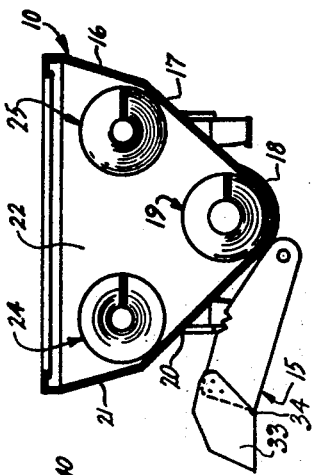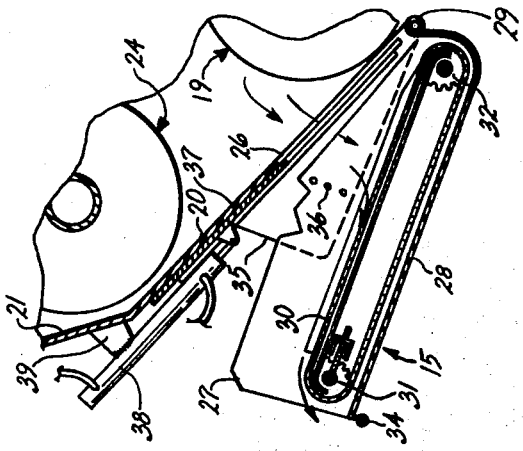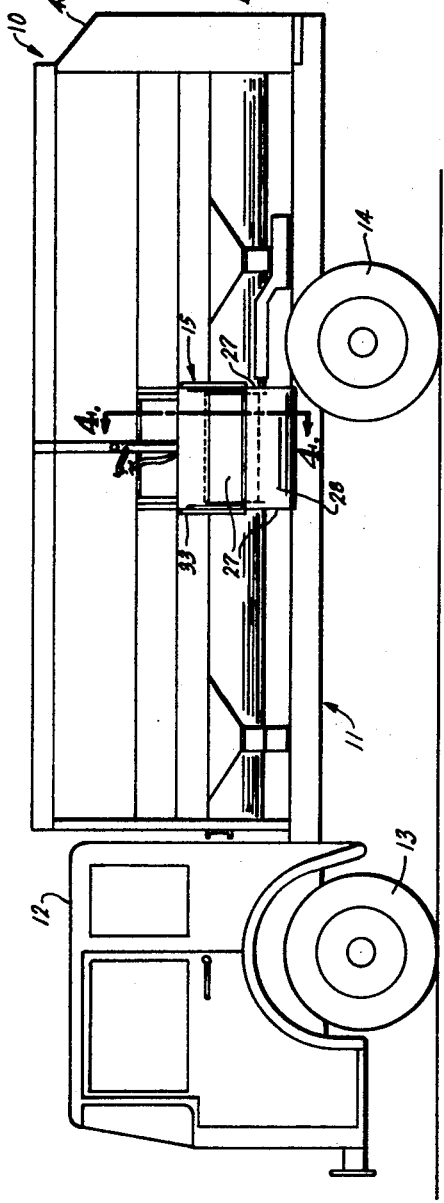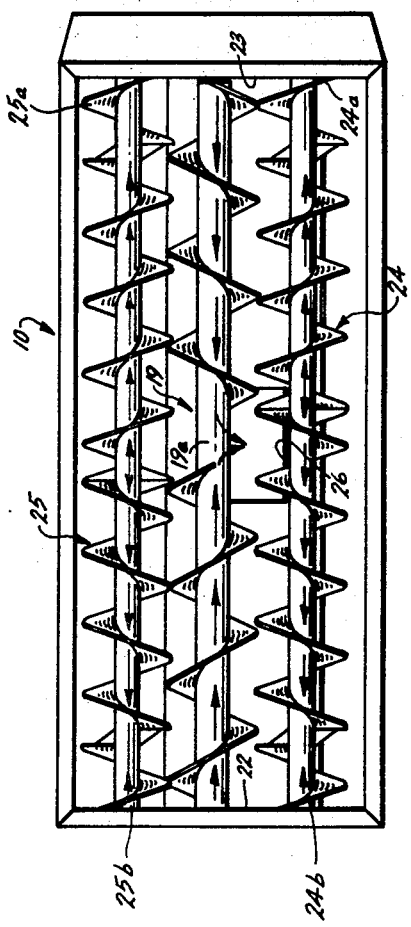

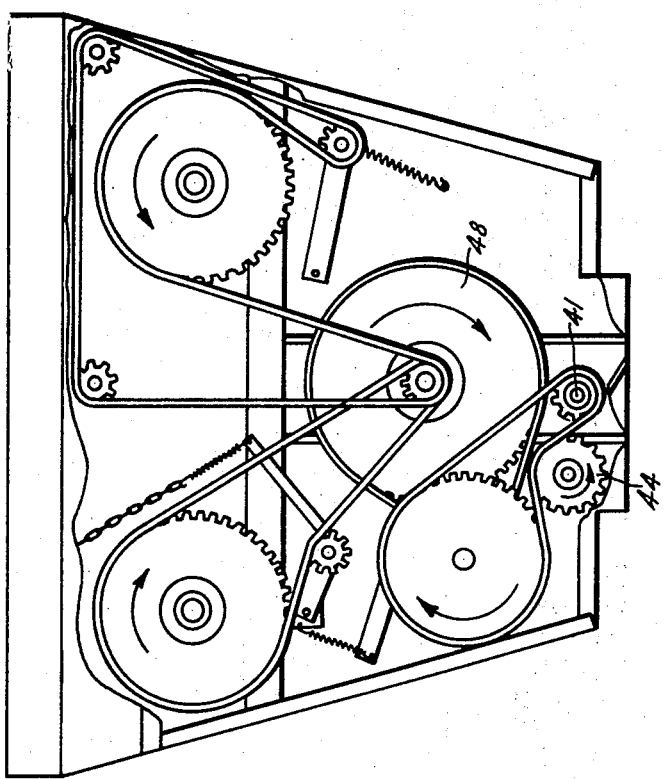
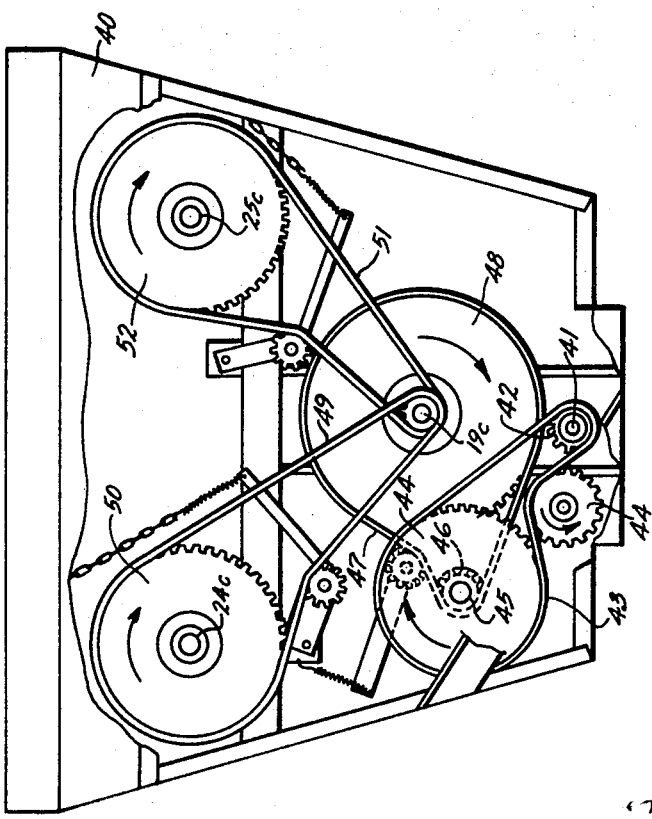
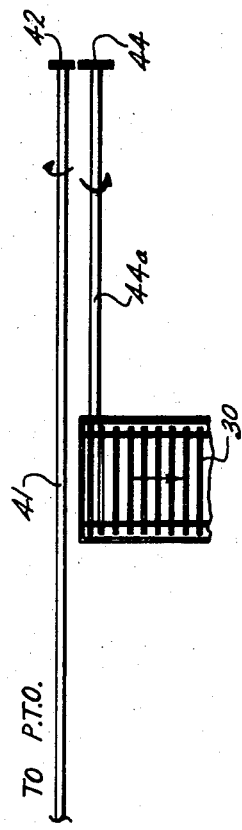

MOBILE FEED MIXER AND BUNK LOADER

BACKGROUND OF THE INVENTION

Mass feeding of livestock is conventionally carried out in feed lots equipped with elongate feed bunks in the forms of troughs into which feed is placed. Mobile feed trucks have been used for introducing feed to the bunks. These also can operate to mix the feed. An example of a box for such a mixer-feeder is shown in the Copeland et al. U.S. Pat. No. 3,090,605. In the patented arrangement, the feed is delivered from adjacent one end of the box laterally to the bunk.

In all mobile mixers for use with feed bunks of which I am aware, the location of the discharge is near the front wheels of the truck, or is at least nearer the front wheels than the rear wheels. As the mixer travels along the feed bunk to deliver feed into it, there are tracking problems, particularly in mud, snow or on rough terrain. The point of discharge of the feed tends to wander toward or away from the feed bunk in a sidewise direction with every change of direction of the front wheels. The operator has problems in maintaining alignment of the feed discharge with the feed bunk and in performing other duties required during loading of the bunks.

SUMMARY OF THE INVENTION

The present invention provides a steerable mobile feed mixer for use with feed bunks which has a distinct advantage over prior art units of which I am aware in that it operates to discharge the mixed feed at a point near the rear wheel axis so that there is a minimum of deviation of the track of the discharge relative to the bunk. I have discovered that through such an arrangement, less spillage of feed outside the bunk occurs. Moreover, the operator has a much easier time assuring of continuous feed to the bunk. The operator can concentrate more on the amount being discharged rather than where.

It has also been determined that the mixing and delivery of the feed are enhanced greatly through having an arrangement in which the discharge is located at the midpoint of the box and near the rear wheels rather than at one end. The unloading time for the mixer is faster for given rates of auger rotation than in end discharge as material moves on both ends toward the center. Furthermore, there is no starvation at the discharge, as can happen in end discharge units, since the discharge opening is always covered by material. The unit can also be operated for a given mixing rate and discharge rate at lower required horsepower. The mixing is also much faster, particularly where a system of three augers is used, the lower auger moving material toward the center and the upper augers picking up and moving material from the midpoint or center toward the ends.

DETAILED DESCRIPTION

In the accompanying drawings, which form a part of the specification, and in which like reference numerals indicate like parts in the various views;

FIG. 1 is a side elevational view of a preferred mobile mixer embodying the invention;

FIG. 2 is a top plan view of the mixing box alone;

FIG. 3 is a somewhat schematic transverse sectional view through the box showing the three mixing augers;

FIG. 4 is an enlarged fragmentary sectional view taken generally along line 4—4 of FIG. 1 in the direction of the arrows;

FIG. 5 is a greatly enlarged end view of the mixing box showing one form of a drive arrangement, which drive arrangement is designed to produce the pattern of flow shown in FIG. 2;

FIG. 6 is a view similar to FIG. 5 but showing a modified form of drive arrangement; and FIG. 7 is a schematic view showing the power train to the discharge conveyor.

Referring now to the drawings and initially to FIG. 1, the mixing chamber for the unit is formed by the mixing box 10 which is supported on the frame or bed of a truck 11. The truck has the cab 12, front wheels 13 and rear wheels 14. The truck is of the type that is provided with a controllable power takeoff (not shown) and of course the usual steering and motor or engine mechanisms. The mixing box is also equipped with a lateral discharge assembly 15, the details of which will be set forth later herein.

The box is generally hopper shaped in cross section. Referring to FIG. 3, the side wall opposite from the discharge assembly 15 has an upper sloping section 16 and a differently angled lower sloping section 17 which joins with an arcuate section 18 which conforms generally with the curvature of the lower portion of the bottom auger 19. On the discharge side there is an upwardly sloping wall portion 20 which joins a somewhat steeper portion 21. The ends 22 and 23 of the box are flat and vertical.

Mounted in the upper portion of the bin are the upper mixing augers 24 and 25. The shafts of these augers are journalled in appropriate bearings carried by the opposite end walls of the unit. The augers 24 and 25 are positioned so that they are adjacent the intersections between the differently sloped wall portions 16 and 17 and 20, 21 of the box side walls.

Below the upper augers and at the bottom of the box is the auger 19. As best seen in FIG. 2, the flighting on the bottom auger 19 is such that when rotated in the proper direction it will serve to move material from near the ends 22, 23 toward the center. In other words, the flights are oppositely pitched and there is a section 19a right at the mid portion of the auger which does not contain any flighting.

The upper augers are similar in configuration in that they have reverse flighting also. However, they are so flighted as to move material away from the midpoint or center toward the ends. However, each of the upper augers does have an additional reverse auger portion. These are reverse portions 25a, 25b and 24a, 24b which tend to prevent material from packing against the wall where the auger ends. The auger flighting is so arranged that there is an overlap of the longest portions, the overlap occurring at the midportion of the box.

As is believed evident from FIG. 2, the pitch of the auger flighting on the upper augers 24 and 25 is somewhat less than the pitch of the flighting on the lower auger 19. Preferably the pitch on the upper augers is approximately three-fourths that of the lower auger. As will be seen, the upper augers are driven at much slower speeds than the lower auger. The flow system illustrated by the arrows in FIG. 2 is set up for a rotation of all augers in the same direction which is clockwise as viewed from the righthand end of the box.

Referring again to FIG. 2, the lower portion of inclined wall 20 is provided with a discharge opening 26. Preferably the discharge opening is rectangular in shape with its lowermost edge at the point of tangency of the sidewall slope to the bottom curve of the box and its uppermost edge above the level of the axis of the auger 19. The opening is symmetrical with respect to the transverse center plane of the box and equidistant from the ends.

Referring to FIG. 4, the discharge assembly 15 includes a pivotal channel having the spaced sidewalls 27 and bottom 28. It is pivoted to the box near the bottom of the opening 26 on a pivot axis 29. Mounted within the channel is a slatted conveyor 30 supported on sprockets 31 and 32 which in turn are journalled in the sidewalls 27. While not shown in FIG. 4, there is an extension member 33 (see FIGS. 1 and 3) which is pivoted to the end of channel 28 on axis 34 and which can be adjusted about the axis 34 by means of spaced perforations and pins or any other adjustable catch means (not shown).

The channel fits between a pair of support plates 35 which are affixed to the box. Openings 36 are provided to receive pins and to provide for adjustment of the angle of the discharge channel 28 with respect to the box.

The opening 26 is controlled by a closure or gate 37 which is carried by the piston of a hydraulic cylinder 38. The cylinder 38 is mounted to the box by the weldment 39. Obviously, the gate can be set at any desired position in order to control the size of the opening.

Referring to FIGS. 1 and 5, the drive system is housed at the rear of the box in a housing having an outer cover 40. The support shaft for auger 24 is shown at 24c and that for auger 25 at 25c and for auger 19 at 19c. The main drive source comprises the shaft 41, which is a shaft running along the bottom of and below the box from the power takeoff of the truck (see FIG. 7). This shaft carries at its rearward end the sprocket 42 which, in the embodiment of FIG. 5, is driven in a clockwise direction. A chain 43 is chained around sprocket 42 and this chain also drivingly engages a sprocket 44 to one side of the sprocket 42 and a larger sprocket 44 mounted on shaft 45. Sprocket 44 is on shaft 44a which goes to the discharge conveyor 30 (see FIG. 7). The shaft 45 carries also a smaller sprocket 46. Trained around sprocket 46 is a chain 47 which goes to sprocket 48 which is secured to the auger shaft 19c and serves as the main drive sprocket for the bottom auger 19. Two smaller sprockets are also mounted on shaft 19c. One drives a chain 49 which goes to the upper drive sprocket 54 for the auger 24c, the other drives a chain 51 which goes to the sprocket 52 for the upper auger 25.

The usual idlers are provided and these can be varied as desired in order to achieve satisfactory tensioning of the chain during operation.

In the FIG. 6 arrangement, the upper augers are rotated oppositely. In some mixes this has been found advantageous. It involves a change in belt 51, plus addition of different idlers as illustrated.

Obviously there is a reduction in speed between the power takeoff shaft 41 and that of the lower auger 19. There is also a reduction from the lower auger to the upper augers.

In operation, the material for a given length box is moved only half as far as in a front discharge unit. As a result, the material is mixed in approximately half the normal time. Comparison tests which have been conducted in between a box of the type herein involved as compared with a front discharge box show a 55 percent reduction in required mixing time to obtain an approved mix. Half the required mixing time means half the wear under the high wear mixing conditions that exist and results in more loads hauled during the working day.

Eighty percent of the mixing action takes place at the convergence point of the bottom auger 19 since material from each end is forced together at the center and mixed. As the material is forced together and moved up to meet the top augers, another mixing action takes place which accounts for another 10 percent of the total. This is accomplished by having two top augers overlapping in their convergingence points. In other words, the top auger 24 pulls more material to the left than it does to the right (as viewed in FIG. 2) whereas the auger 25 pulls more to the right hand than it does to the left. In this way, the material is constantly changing end which also serves to level the load. The final 10 percent of the total mix is accomplished (5 percent at each end) as material moves to the ends and then drops down to be picked up by the lower auger 19.

By having the bottom auger converge at the center, the conveyor opening is always supplied with a full supply of material to be discharged. By this means the discharge conveyor will run full until the box is empty. There is no trailing off of conveyor discharge during the last half of the load as with an end mounted discharge because of an always available supply of material at the discharge opening, it is possible to provide for a more rapid discharge speed in the discharge conveyor.

As earlier pointed out, because of the discharge being located close to the rear wheel, there is better tracking along the bunk since the variance of front wheel spacing from the bunk is not as critical as with a front discharge machine. Consequently, the operator can concentrate more on other tasks such as constant observation of the quantity of discharge and uniformity and where scales are included in the truck, the change in weight. Also, the location of the discharge near the rear wheels provides much better visibility of the discharge conveyor through the rear view mirror, which in turn allows the driver more freedom in observing scales and the tracking of the truck.

From the foregoing, it will be seen that this invention is one well adapted to attain all the ends and objects hereinabove set forth, together with other advantages which are obvious and which are inherent to the invention.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawing is to be interpreted as illustrative and not in a limiting sense.

Having thus described my invention, I claim:

1. A mobile feed mixer for delivering feed to elongate feed bunks comprising
a powered, steerable chassis for movement along the bunk and having front and rear wheels,
a mixing box mounted on said chassis, the fore and aft center of said box being near said rear wheels,
feed mixing means located within said box and operable to mix and circulate feed within said box, said mixing means including a feed advancing mechanism in the lower part of said box operable to move feed from near the ends of the box toward said center of the box, and
lateral discharge means at said center operable to move feed sideways from the box to a discharge point for delivery to the feed bunk, said center being located just forward of the rear wheels with a portion of the discharge means overlying a forward portion of a rear wheel on one side.

* * * * *